United States Patent Office 2,976,305
Patented Mar. 21, 1961

2,976,305

SALTS OF DITHIOCARBAMIC ACIDS DERIVED FROM AMINO AMIDES OF DICARBOXYLIC ACIDS

Johannes Reese and Ernst August Bartels, Wiesbaden-Biebrich, Germany, assignors to Chemische Werke Albert, Wiesbaden-Biebrich, Germany, a corporation of Germany No Drawing. Filed June 4, 1959, Ser. No. 818,008

Claims priority, application Germany July 30, 1958

8 Claims. (Cl. 260—429)

This invention relates to novel salts of dithiocarbamic acids derived from amino amides of dicarboxylic acids and to their production. More particularly, the invention relates to a new class of dithiocarbamic fungicides.

It has been found that one obtains novel compounds which possess strongly fungicidal properties if one reacts dicarboxylic acid amino amides of the formula

—CONH(CH$_2$)$_x$[NH(CH$_2$)$_x$]$_y$NH$_2$ wherein R represents a substituted or unsubstituted hydrocarbon radical, $x$ represents 2 or 3 and $y$ represents 0 to 3, with carbon disulfide and with equivalent quantities of an alkali, to form the corresponding dithiocarbamic acid salts. These salts can be applied as fungicides as such, or, after having reacted them with metallic salts of zinc, manganese, copper, iron or the like to thereby form their less soluble salts.

In the new compounds the proportion of the grouping

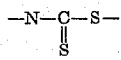

generally regarded as the functional group imparting the fungicidal effect, is considerably smaller than, for instance, in the corresponding known salts of ethylene-bis-thiocarbamic acid. Yet the fungicidal activity of the new compounds is at least as good and in a number of instances even better than that of the known compounds. Moreover, the compounds hereof excel by showing good compatibility with plants and by possessing good storage stability.

When starting with readily available raw materials, the compounds of the invention are made in such manner that first dicarboxylic acids or their anhydrides or other functionally reactive derivatives are reacted with at least 2 moles of an aliphatic polyamine, containing at least two primary amino groups, which are separated from each other through an ethylene or propylene group. This initial reaction may be effected by heating the reactants to 100–200° C. thereby converting the dicarboxylic acid into the amino amide. Then these, initial reaction products, after being appropriately diluted with water, are reacted with carbon disulfide and an alkali into the alkali salts of the dithiocarbamic acid derived from the amino amides. Through an addition of metal salt solutions of zinc, copper, iron or manganese, the less soluble salts of the dithiocarbamic acid derivatives can be precipitated and these salts can easily be filtered and dried.

Instead of dicarboxylic acid or its anhydrides, one can also use their functionally reactive derivatives such as monoalcohol esters or halides. It will be apparent, however, that the anhydrides or acids are preferred for under such circumstances water only is a by-product. In the interest of simplification such reactive compounds are referred to herein as "reactive dicarboxylic compounds."

Various types of dicarboxylic acids may be used for the formation of the amino amides including aliphatic saturated and unsaturated dicarboxylic acids as well as aromatic dicarboxylic acids. Representative, and preferred, dicarboxylic acids include: oxalic acid, glutaric acid, succinic acid, adipic acid, pimelic acid, sebacic acid, fumaric acid, maleic acid and phthalic acid. Tetrachlorophthalic acid can also be used.

Likewise a variety of alkylene polyamides may be used as reactants including ethylene diamine, diethylene triamine, triethylene tetramine, propylene diamine, dipropylene triamine and tripropylene tetramine. One can also start with mixtures of these polyamines. One can achieve good results with the technical mixtures, resulting from the reaction of ethylene chloride with ammonia, such as mixtures of ethylene diamine, diethylene triamine and of higher polyethylene amines.

A preferred method of preparing the new fungicides consists in heating the dicarboxylic acid, or its anhydrides, with polyamines to temperatures of 100–200° C. under a reflux until such time as the decrease in the presence of the free amino groups, which is titrable, corresponds to the desired amide formation.

The carbon disulfide is advantageously added at temperatures which are under its boiling point. It is advantageous, also, first to dilute the amino amides with water, then to add the proper amount of alkali. Small quantities of unreacted carbon disulfide can be vaporized off through slight heating.

In the reaction with a soluble salt of zinc, iron, manganese etc., an almost insoluble precipitation appears, which is sucked off and dried. It can also be dried through spray drying.

The salts of the invention surprisingly show exceptionally good effectiveness as fungicides, which effectiveness has been tested through the spore-germ test against Alternaria tenuis, against Vine Peronospora, and against Phytophthora. The effect of the novel substances hereof was not only at least equivalent to that of the zinc salt of the known ethylene-bis-dithiocarbamic acids, but rather superior thereto. Obviously, the fungicidal effect of the dithiocarbamic acid group is being influenced in an unexpected manner through the amide grouping.

One frequently regards as a measure of the dithiocarbamic acid content of a compound the relative quantity of carbon disulfide which is freed during hydrolysis. These values for the new zinc salts hereof, as established according to the method of D. G. Clarke and collaborators and described in Analytical Chemistry 23 (1951), are considerably lower than those of compounds such as the zinc salts of ethylene-bis-dithiocarbamic acid. This fact further demonstrates the superior fungicidal potency of the compounds hereof.

When used as fungicides, the products of this invention can be used in soluble or insoluble form, with wetting agents, emulsifiers, carrier substances, solvents etc. and, as required by a given situation, may be dusted or sprayed onto the product to be protected. They can also be used with other known fungicides, as, for instance, with trichloromethylsulfonyl derivative of tetrahydrophthalimide, known as Captan, with the known metal salts of ethylene-bis-dithiocarbamic acid; with copper or sulfur preparations; or with other fungicides. They can also be used mixed with known insecticides, as, for instance, gamma hexachlorocyclohexane 1,1,1 - trichloro-2,2-bis(p-chlorophenyl) ethane or the like.

The following specific, but purely illustrative, examples will further contribute to an understanding of the invention and its significance. In the examples, the parts are expressed as parts by weight.

*Example 1*

One hundred forty-eight (148) parts of phthalic acid anhydride are heated for two hours under reflux to 130°

C. with 137 parts of 88% ethylene diamine. The resulting amino amides of phthalic acid in a solution diluted with 150 parts of water, is heated and reacted with 160 parts of a 50% sodium hydroxide solution and 152 parts of carbon disulfide for an additional two hours at 35–40° C. The zinc salt is precipitated from the solution through the addition of 136 parts of zinc chloride dissolved in an equal quantity of water.

The dried product yields on hydrolysis with boiling sulfuric acid, according to the method of Clarke and associate, 28.3% carbon disulfide.

*Example 2*

Twenty-four and five tenths (24.5) parts of maleic acid anhydride and 43 parts of ethylene diamine with a 70% diamine content, are heated under reflux at 120–130° C. until the acid number is approximately 0. The resulting resin is dissolved in water, carbon disulfide is stirred into it and after one hour it is mixed with 60 parts of a 33.3% sodium hydroxide solution. After precipitation with 70 parts of a 50% zinc chloride solution, separation and drying of the precipitation, one obtains 93 parts of a white powder.

*Example 3*

Forty-three (43) parts of a 70% ethylene diamine and 36.5 parts of adipic acid yield after three hours heating to 120° C. and distillation of the water, in a vacuum, 55 parts of a yellow-colored, clear resin. After addition of water, this resin is brought into reaction with 38 parts of carbon disulfide and 60 parts of a 33.3% sodium hydroxide at temperatures of 35–40° C. and the zinc salt is thereafter precipitated.

*Example 4*

In the same manner as shown in Example 2, succinic acid anhydride, instead of maleic acid anhydride, is converted into the zinc salt of the bis-dithiocarbamic acid derivative of the amine amide derived from ethylene diamine.

*Example 5*

The product produced in Example 1 in a 50% proportion is mixed with 15% of a powdered cellulose pitch (such as obtained from the evaporation of sulfite waste liquor) and 35% of a carrier substance such as kaolin, and the mixture finely ground. In a practical application 0.2% of this preparation was sprayed onto vine leaves, which were treated one day later with a conidium suspension of the *Plasmora vitacola* fungus. The infection of the test plants with vine-Peronospora was completely prevented, whereas the previously untreated control plants showed strong outbreaks of Peronospora.

*Example 6*

In the spore germinating test against *Alternaria tenuis*, the product according to Example 3 was tested. The result showed that with an application of 2 gamma per cm.$^2$ of the product of Example 3 as the fungicide, one obtained a 100% prevention of the germination of the spores. When using the known fungicide zinc ethylene-bis-dithiocarbamate, the value has been reached only with an effective quantity of 6–8 gamma per cm.$^2$ Thus, the product of this invention has about double to triple the effectiveness of this known compound.

*Example 7*

The product produced in Example 4 in a 75% proportion is mixed with 12% cellulose pitch powder as well as with 13% of a carrier substance. The mixture was finely ground and thereby converted into a sprayable powder. A 0.25% spraying solution of this preparation prevents the artificial infection of potato plants with a conidium of the fungus *Phytopthora infestans*.

The foregoing examples have disclosed the water soluble alkali metal salts of the dithiocarbamic acid derivatives of the amino amides of the examples and the corresponding less soluble salts as obtained by reacting the water soluble salts with salts of zinc. Other less soluble salts are likewise obtained by reactions with water soluble salts of copper, iron or manganese. Also other ethylene polyamines of the type described herein and propylene polyamines may be used in place of the illustrative ethylene diamine.

It will be understood that the embodiments of this invention described and illustrated herein are only representative of the principles of the invention and that various other reactants and reaction products of the invention will occur to those skilled in the art as a result of these specific disclosures and will fall within the spirit and scope of the invention which is defined by the appended claims.

What is claimed is:

1. A process for producing novel dithiocarbamic acid compounds, which comprises (1) reacting at an elevated temperature and in a molar ratio of at least 2:1 (a) an alkylene polyamine of the formula $$H_2N-[(CH_2)_xNH]_y(CH_2)_xNH_2$$

wherein $x$ is 2 to 3 and $y$ is 0 to 3, with (b) a reactive dicarboxylic acid compound of the formula $$HOOC-R-COOH$$

wherein R is selected from the group consisting of $C_6H_4$, $CH=CH$ and $(CH_2)_{0-8}$ to form the amino amide of the dicarboxylic acid; and (2) reacting the formed amino amide with carbon disulfide in an aqueous alkaline solution of an alkali metal hydroxide to form an alkali metal salt of the dithiocarbamic acid derived from said amino amide.

2. A process for producing novel dithiocarbamic acid compounds, which comprises (1) reacting at an elevated temperature and in a molar ratio of at least 2:1 (a) an alkylene polyamine of the formula $$H_2N-[(CH_2)_xNH]_y(CH_2)_xNH_2$$

wherein $x$ is 2 to 3 and $y$ is 0 to 3, with (b) a reactive dicarboxylic acid compound of the formula $$HOOC-R-COOH$$

wherein R is selected from the group consisting of $C_6H_4$, $CH=CH$ and $(CH_2)_{0-8}$ to form the amino amide of the dicarboxylic acid; (2) reacting the formed amino amide with carbon disulfide in an aqueous alkaline solution of an alkali metal hydroxide to form an alkali metal salt of the dithiocarbamic acid derived from said amino amide; and (3) reacting said alkali metal salt with a water soluble salt of a compound selected from the group consisting of zinc, iron, copper and manganese to form a less soluble salt of said amino amide.

3. Salts of dithiocarbamic acid compounds having the formula

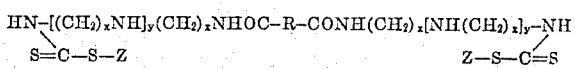

in which R is selected from the group consisting of $C_6H_4$, $CH=CH$ and $(CH_2)_{0-8}$, $x$ is 2 to 3, $y$ is 0 to 3 and Z is an equivalent of a metal selected from the group consisting of alkali metals, zinc, iron, manganese and copper.

4. Salts of dithiocarbamic acid compounds having the formula

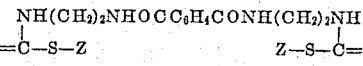

in which Z is an equivalent of a metal selected from the group consisting of alkali metals, zinc, iron, manganese and copper.

5. Salts of dithiocarbamic acid compounds having the formula

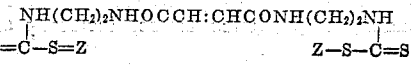

in which Z is an equivalent of a metal selected from the group consisting of alkali metals, zinc, iron, manganese and copper.

6. Salts of dithiocarbamic acid compounds having the formula

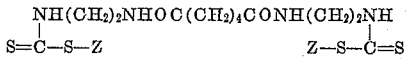

in which Z is an equivalent of a metal selected from the group consisting of alkali metals, zinc, iron, manganese and copper.

7. Salts of dithiocarbamic acid compounds having the formula

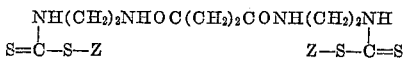

in which Z is an equivalent of a metal selected from the group consisting of alkali metals, zinc, iron, manganese and copper.

8. Salts of dithiocarbamic acid compounds having the formula

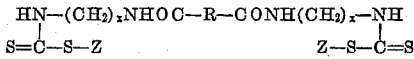

in which R is selected from the group consisting of $C_6H_4$, $CH=CH$ and $(CH_2)_{0-8}$, $x$ is 2 to 3 and Z is an equivalent of a metal selected from the group consisting of alkali metals, zinc, iron, manganese and copper.

No references cited.